Jan. 12, 1971  B. T. ROGERS, JR  3,554,630
ALIGNMENT TELESCOPE
Filed Sept. 11, 1968
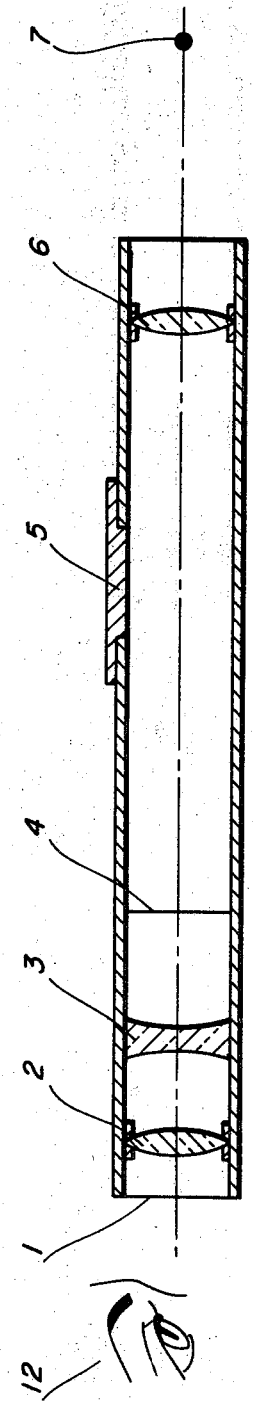
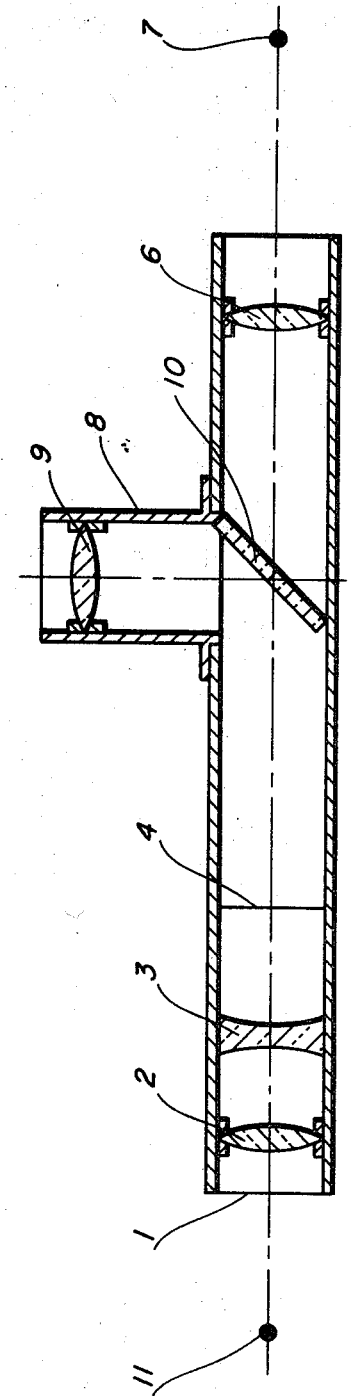
INVENTOR.
Benjamin T. Rogers
BY 3,554,630
ALIGNMENT TELESCOPE
Benjamin T. Rogers, Jr., Embudo, N. Mex., assignor to the United States of America as represented by the United States Atomic Energy Commission
Filed Sept. 11, 1968, Ser. No. 758,940
Int. Cl. G01b *11/26;* G02b *27/32*
U.S. Cl. 350—10                               1 Claim

ABSTRACT OF THE DISCLOSURE

An alignment telescope for locating points along a line from a fixed point having lens structure to establish said line from the fixed point and a moveable mirror and eyepiece means for introduction into the device to locate points along said line.

---

The invention described herein was made in the course of, or under, a contract with the U.S. Atomic Energy Commission.

The invention relates to an alignment telescope that allows reference to a fixed point close to the telescope in one direction along a line and allows other points to be brought into focus along the line in the opposite direction. Thus, points may be located anywhere along the line between two fixed points. The telescope may also be utilized in autocollimation so that any point on a line with the center of the autocollimation target and normal to the surface of the autocollimation surface may be located.

Previous alignment telescopes, when locating points on a line between two fixed points, utilized repeated reversal of a telescope on an adjustable alignment device until the telescope was on the axis between the two points. This method was suspect in that repeated manual lifting and replacing can easily cause misalignment.

This device allows precise alignment without reversal of the telescope and therefore eliminates errors induced by the above mentioned manual manipulation. Among the practical applications of this device is the alignment of a particle source such as an accelerator and the target to be bombarded. The device has special utility in alignment of an established fixed point near the telescope and other points located along the line. However, additional utility in various alignment problems is contemplated and the device is useful in all operations involving establishment of a line and locating points along the line.

The above and additional objects and advantages of the present invention will be made evident as the specification proceeds with reference to the following specification and claims and the illustrations in the accompanying drawings, Referring to the drawings, FIG. 1 is a diagrammatic view of an embodiment of this invention showing alignment with the fixed point.

FIG. 2 is a diagrammatic view of an embodiment of this invention showing the moveable mirror and eyepiece in place.

In FIG. 1 the device is indicated at 1, shown with the moveable mirror and eyepiece assembly removed and a cover 5 in its place. To facilitate movement of the mirror and eyepiece assembly in and out of the optical path and to support the assembly when not in place a suitable slide mechanism (not shown) may be employed which will further reduce the chance of misalignment. The device is shown being aligned with the fixed point 7 by an individual sighting through lenses 2, 3, and 6 to superimpose the image of fixed point 7 on the reticule 4. The fixed point in this embodiment is deemed to be established and immoveable such as the aperture of an accelerator but it is to be understood that various applications of the device are contemplated within the cognizance of a person skilled in the art. Focussing is done by changing the space between lenses 2 and 3 to accommodate the eye 12 of the observer who is now looking in through the front of the instrument in this mode of operation. Parallax is eliminated in the usual manner by adjusting lens 6. The lenses shown in this embodiment have the following powers: lens 2, plus ten; lens 3, minus four; and lens 6, plus twenty; with the powers expressed in diopters and plus meaning positive and minus meaning negative.

FIG. 2 shows the mirror 10 and eyepiece 9 moved into the optical path as an assembly 8, and the object 11 to be located is brought into focus on the reticule 4 by adjusting the minus four lens 3. The eyepiece 9 is adjusted to bring the reticule 4 and its superimposed image of the object 11 into focus. A check for parallax may then be made and the additional corrections of the focus accomplished.

In another mode of operation the fixed point 7 may be replaced by an autocollimation target. The plus twenty lens 6 is then focussed at infinity and the instrument as a whole, with the diagonal mirror 10 and eye lens 9 moved out of the optical path, may be used as an autocollimator with respect to this target. (The addition of a reticule illuminator is presumed.) By successively focussing the plus twenty lens 6 at infinity, autocollimating and then bringing the autocollimation target into focus with the same lens, one can place the instrument so that it is on a line with the center of the autocollimation target and normal to the target surface. Having thus established the instrument on line by autocollimation and by reference to the center of the autocollimation target, the diagonal mirror 10 and the eye lens 9 can be moved into the optical path and this line can then be prolonged to a distant target by use of the plus ten minus four power lens system. Final autocollimation may require an auxiliary magnifier in front of the plus ten lens 2 if the job requires extremely high sensitivity.

What I claim is:

1. An alignment device comprising a single, rigidly mounted reticule, a first lens system on one side of said reticule, said first lens system having a plus 10 diopter lens and a minus 4 diopter lens, a second lens system on the opposite side of said reticule from the first lens system, said second lens system having a plus 20 diopter lens said reticule and said first and second lens systems defining an optical path, a moveable mirror and an eyepiece means for movement in and out of said optical path between said reticule and said second lens system, whereby when said mirror and eyepiece means is out of said optical path said second lens system functions as an objective lens system to form a first image on said reticule, and said first lens system functions as an ocular lens system for viewing said first image; and when said mirror and eyepiece means is placed in said optical path said first lens system functions as an objective lens system forming a second image on said reticule, and said second image is reflected by said mirror to said eyepiece means for viewing said second image.

References Cited

UNITED STATES PATENTS

| | | | |
|---|---|---|---|
| 914,754 | 3/1909 | Saegmuller | 350—34 |
| 1,086,140 | 2/1914 | Cleary | 350—10 |

FOREIGN PATENTS

| | | | |
|---|---|---|---|
| 50,383 | 8/1909 | Switzerland | 356—153 |

DAVID SCHONBERG, Primary Examiner

T. H. KUSMER, Assistant Examiner

U.C. Cl. X.R.

350—18, 28, 34, 48; 356—172, 247, 255